US008666985B2

(12) United States Patent
Wood et al.

(10) Patent No.: US 8,666,985 B2
(45) Date of Patent: Mar. 4, 2014

(54) HARDWARE ACCELERATED APPLICATION-BASED PATTERN MATCHING FOR REAL TIME CLASSIFICATION AND RECORDING OF NETWORK TRAFFIC

(75) Inventors: Matthew S. Wood, Salt Lake City, UT (US); Joseph H. Levy, Eagle Mountain, UT (US); McKay Marston, Riverton, UT (US)

(73) Assignee: Solera Networks, Inc., South Jordan, UT (US)

( * ) Notice: Subject to any disclaimer, the term of this patent is extended or adjusted under 35 U.S.C. 154(b) by 0 days.

(21) Appl. No.: 13/421,757

(22) Filed: Mar. 15, 2012

(65) Prior Publication Data

US 2012/0239652 A1     Sep. 20, 2012

Related U.S. Application Data

(60) Provisional application No. 61/453,456, filed on Mar. 16, 2011.

(51) Int. Cl.
*G06F 7/00*     (2006.01)

(52) U.S. Cl.
USPC ............... 707/737; 707/E17.002; 707/E17.08

(58) Field of Classification Search
None
See application file for complete search history.

(56) References Cited

U.S. PATENT DOCUMENTS

| 5,274,643 A | 12/1993 | Fisk |
| 5,440,719 A | 8/1995 | Hanes et al. |
| 5,526,283 A | 6/1996 | Hershey et al. |
| 5,602,830 A | 2/1997 | Fichou et al. |
| 5,758,178 A | 5/1998 | Lesartre |
| 6,041,053 A | 3/2000 | Douceur et al. |
| 6,101,543 A | 8/2000 | Alden et al. |
| 6,145,108 A | 11/2000 | Ketseoglou |
| 6,185,568 B1 | 2/2001 | Douceur et al. |

(Continued)

FOREIGN PATENT DOCUMENTS

| EP | 0838930 A2 | 4/1998 |
| EP | 1004185 B1 | 5/2000 |

(Continued)

OTHER PUBLICATIONS

Smith, R., et al., "Evaluating GPUs for Network Packet Signature Matching", Performance Analysis of Systems and Software, 2009. ISPASS 2009. IEEE International Symposium Apr. 26-28, 2009.*

(Continued)

*Primary Examiner* — Robert Beausoliel, Jr.
*Assistant Examiner* — Nirav K Khakhar
(74) *Attorney, Agent, or Firm* — Cooley LLP

(57) ABSTRACT

An indexing database utilizes a non-transitory storage medium. A pattern matching processing unit generates pre-classification data for the network data packets utilizing pattern matching analysis. At least one processing unit implements a storage process that receives the network data packets, stores the network data packets in at least one of the slots, and transfers the network data packets to a packet capture repository when slots in a shared memory are full. A preclassification process requests from the pattern matching processing unit the preclassification data. An indexing process determines, based upon the preclassification data, whether to invoke or omit additional analysis of the network data packets, and performs at least one of aggregation, classification, or annotation of the network data packets in the shared memory to maintain one or more indices in the indexing database.

9 Claims, 6 Drawing Sheets

(56) References Cited

U.S. PATENT DOCUMENTS

| | | |
|---|---|---|
| 6,336,117 B1 | 1/2002 | Massarani |
| 6,370,622 B1 | 4/2002 | Chiou et al. |
| 6,400,681 B1 | 6/2002 | Bertin et al. |
| 6,453,345 B2 | 9/2002 | Trcka et al. |
| 6,516,380 B2 | 2/2003 | Kenchammana-Hoskote et al. |
| 6,522,629 B1 | 2/2003 | Anderson, Sr. |
| 6,591,299 B2 | 7/2003 | Riddle et al. |
| 6,628,617 B1 | 9/2003 | Karol et al. |
| 6,628,652 B1 | 9/2003 | Chrin et al. |
| 6,675,218 B1 | 1/2004 | Mahler et al. |
| 6,693,909 B1 | 2/2004 | Mo et al. |
| 6,708,292 B1 | 3/2004 | Mangasarian |
| 6,754,202 B1 | 6/2004 | Sun et al. |
| 6,782,444 B1 | 8/2004 | Vishlitzky et al. |
| 6,789,125 B1 | 9/2004 | Aviani et al. |
| 6,907,468 B1 | 6/2005 | Moberg et al. |
| 6,907,520 B2 | 6/2005 | Parady |
| 6,928,471 B2 | 8/2005 | Pabari et al. |
| 6,956,820 B2 | 10/2005 | Zhu et al. |
| 6,958,998 B2 | 10/2005 | Shorey |
| 6,993,037 B2 | 1/2006 | Boden et al. |
| 6,999,454 B1 | 2/2006 | Crump |
| 7,002,926 B1 | 2/2006 | Eneboe et al. |
| 7,024,609 B2 | 4/2006 | Wolfgang et al. |
| 7,028,335 B1 | 4/2006 | Borella et al. |
| 7,032,242 B1 | 4/2006 | Grabelsky et al. |
| 7,039,018 B2 | 5/2006 | Singh et al. |
| 7,047,297 B2 | 5/2006 | Huntington et al. |
| 7,058,015 B1 | 6/2006 | Wetherall et al. |
| 7,061,874 B2 | 6/2006 | Merugu et al. |
| 7,065,482 B2 | 6/2006 | Shorey et al. |
| 7,072,296 B2 | 7/2006 | Turner et al. |
| 7,075,927 B2 | 7/2006 | Mo et al. |
| 7,116,643 B2 | 10/2006 | Huang et al. |
| 7,126,944 B2 | 10/2006 | Rangarajan et al. |
| 7,126,954 B2 | 10/2006 | Fang et al. |
| 7,142,507 B1 | 11/2006 | Kurimoto et al. |
| 7,145,906 B2 | 12/2006 | Fenner |
| 7,151,751 B2 | 12/2006 | Tagami et al. |
| 7,154,896 B1 | 12/2006 | Kim et al. |
| 7,162,649 B1 | 1/2007 | Ide et al. |
| 7,168,078 B2 | 1/2007 | Bar et al. |
| 7,200,122 B2 | 4/2007 | Goringe et al. |
| 7,203,173 B2 | 4/2007 | Bonney et al. |
| 7,218,632 B1 | 5/2007 | Bechtolsheim et al. |
| 7,237,264 B1 | 6/2007 | Graham et al. |
| 7,240,166 B2 | 7/2007 | Ganfield |
| 7,254,562 B2 | 8/2007 | Hsu et al. |
| 7,269,171 B2 | 9/2007 | Poon et al. |
| 7,274,691 B2 | 9/2007 | Rogers et al. |
| 7,277,399 B1 | 10/2007 | Hughes, Jr. |
| 7,283,478 B2 | 10/2007 | Barsheshet et al. |
| 7,292,591 B2 | 11/2007 | Parker et al. |
| 7,330,888 B2 | 2/2008 | Storry et al. |
| 7,340,776 B2 | 3/2008 | Zobel et al. |
| 7,359,930 B2 | 4/2008 | Jackson et al. |
| 7,376,731 B2 | 5/2008 | Khan et al. |
| 7,376,969 B1 | 5/2008 | Njemanze et al. |
| 7,379,426 B2 | 5/2008 | Sekiguchi |
| 7,385,924 B1 | 6/2008 | Riddle |
| 7,386,473 B2 | 6/2008 | Blumenau |
| 7,391,769 B2 | 6/2008 | Rajkumar et al. |
| 7,406,516 B2 | 7/2008 | Davis et al. |
| 7,408,938 B1 | 8/2008 | Chou et al. |
| 7,418,006 B2 | 8/2008 | Damphier et al. |
| 7,420,992 B1 | 9/2008 | Fang et al. |
| 7,423,979 B2 | 9/2008 | Martin |
| 7,433,326 B2 | 10/2008 | Desai et al. |
| 7,440,464 B2 | 10/2008 | Kovacs |
| 7,441,267 B1 | 10/2008 | Elliott |
| 7,444,679 B2 | 10/2008 | Tarquini et al. |
| 7,450,560 B1 | 11/2008 | Grabelsky et al. |
| 7,450,937 B1 | 11/2008 | Claudatos et al. |
| 7,453,804 B1 | 11/2008 | Feroz et al. |
| 7,457,277 B1 | 11/2008 | Sharma et al. |
| 7,457,296 B2 | 11/2008 | Kounavis et al. |
| 7,457,870 B1 | 11/2008 | Lownsbrough et al. |
| 7,466,694 B2 | 12/2008 | Xu et al. |
| 7,467,202 B2 | 12/2008 | Savchuk |
| 7,480,238 B2 | 1/2009 | Funk et al. |
| 7,480,255 B2 | 1/2009 | Bettink |
| 7,483,424 B2 | 1/2009 | Jain et al. |
| 7,489,635 B2 | 2/2009 | Evans et al. |
| 7,493,654 B2 | 2/2009 | Bantz et al. |
| 7,496,036 B2 | 2/2009 | Olshefski |
| 7,496,097 B2 | 2/2009 | Rao et al. |
| 7,499,590 B2 | 3/2009 | Seeber |
| 7,508,764 B2 | 3/2009 | Back et al. |
| 7,512,078 B2 | 3/2009 | Swain et al. |
| 7,512,081 B2 | 3/2009 | Ayyagari et al. |
| 7,522,521 B2 | 4/2009 | Bettink et al. |
| 7,522,594 B2 | 4/2009 | Piche et al. |
| 7,522,599 B1 | 4/2009 | Aggarwal et al. |
| 7,522,604 B2 | 4/2009 | Hussain et al. |
| 7,522,605 B2 | 4/2009 | Spencer et al. |
| 7,522,613 B2 | 4/2009 | Rotsten et al. |
| 7,525,910 B2 | 4/2009 | Wen |
| 7,525,963 B2 | 4/2009 | Su et al. |
| 7,526,795 B2 | 4/2009 | Rollins |
| 7,529,196 B2 | 5/2009 | Basu et al. |
| 7,529,242 B1 | 5/2009 | Lyle |
| 7,529,276 B1 | 5/2009 | Ramakrishnan |
| 7,529,932 B1 | 5/2009 | Haustein et al. |
| 7,529,939 B2 | 5/2009 | Bruwer |
| 7,532,623 B2 | 5/2009 | Rosenzweig et al. |
| 7,532,624 B2 | 5/2009 | Ikegami et al. |
| 7,532,633 B2 | 5/2009 | Rijsman |
| 7,532,726 B2 | 5/2009 | Fukuoka et al. |
| 7,533,256 B2 | 5/2009 | Walter et al. |
| 7,533,267 B2 | 5/2009 | Yoshimura |
| 7,548,562 B2 | 6/2009 | Ward et al. |
| 7,561,569 B2 | 7/2009 | Thiede |
| 7,617,314 B1 | 11/2009 | Bansod et al. |
| 7,684,347 B2 | 3/2010 | Merkey et al. |
| 7,694,022 B2 | 4/2010 | Garms et al. |
| 7,730,011 B1 | 6/2010 | Deninger et al. |
| 7,792,818 B2 | 9/2010 | Fain et al. |
| 7,853,564 B2 | 12/2010 | Mierau et al. |
| 7,855,974 B2 | 12/2010 | Merkey et al. |
| 7,881,291 B2 | 2/2011 | Grah |
| 7,904,726 B2 | 3/2011 | Elgezabal |
| 8,068,431 B2 | 11/2011 | Varadarajan et al. |
| 2001/0039579 A1 | 11/2001 | Trcka et al. |
| 2002/0085507 A1 | 7/2002 | Ku et al. |
| 2002/0089937 A1 | 7/2002 | Venkatachary et al. |
| 2002/0091915 A1 | 7/2002 | Parady |
| 2002/0138654 A1 | 9/2002 | Liu et al. |
| 2002/0163913 A1 | 11/2002 | Oh |
| 2002/0173857 A1 | 11/2002 | Pabari et al. |
| 2002/0191549 A1 | 12/2002 | McKinley et al. |
| 2003/0009718 A1 | 1/2003 | Wolfgang et al. |
| 2003/0014517 A1 | 1/2003 | Lindsay et al. |
| 2003/0028662 A1 | 2/2003 | Rowley et al. |
| 2003/0088788 A1 | 5/2003 | Yang |
| 2003/0135525 A1 | 7/2003 | Huntington |
| 2003/0135612 A1 | 7/2003 | Huntington et al. |
| 2003/0188106 A1 | 10/2003 | Cohen |
| 2003/0214913 A1 | 11/2003 | Kan et al. |
| 2003/0221003 A1 | 11/2003 | Storry et al. |
| 2003/0231632 A1 | 12/2003 | Haeberlen |
| 2003/0233455 A1 | 12/2003 | Leber et al. |
| 2004/0010473 A1 | 1/2004 | Hsu et al. |
| 2004/0078292 A1 | 4/2004 | Blumenau |
| 2004/0100952 A1 | 5/2004 | Boucher et al. |
| 2004/0103211 A1 | 5/2004 | Jackson et al. |
| 2004/0218631 A1 | 11/2004 | Ganfield |
| 2004/0260682 A1 | 12/2004 | Herley et al. |
| 2005/0015547 A1 | 1/2005 | Yokohata et al. |
| 2005/0050028 A1 | 3/2005 | Rose et al. |
| 2005/0055399 A1 | 3/2005 | Savchuk |
| 2005/0063320 A1 | 3/2005 | Klotz et al. |
| 2005/0083844 A1 | 4/2005 | Zhu et al. |
| 2005/0108573 A1 | 5/2005 | Bennett et al. |
| 2005/0117513 A1 | 6/2005 | Park et al. |

(56) References Cited

U.S. PATENT DOCUMENTS

| | | |
|---|---|---|
| 2005/0132046 A1 | 6/2005 | de la Iglesia et al. |
| 2005/0132079 A1 | 6/2005 | Iglesia et al. |
| 2005/0207412 A1 | 9/2005 | Kawashima et al. |
| 2005/0229255 A1 | 10/2005 | Gula et al. |
| 2005/0249125 A1 | 11/2005 | Yoon et al. |
| 2005/0265248 A1 | 12/2005 | Gallatin et al. |
| 2006/0013222 A1 | 1/2006 | Rangan et al. |
| 2006/0037072 A1 | 2/2006 | Rao et al. |
| 2006/0069821 A1 | 3/2006 | P et al. |
| 2006/0083180 A1 | 4/2006 | Baba et al. |
| 2006/0088040 A1 | 4/2006 | Kramer et al. |
| 2006/0114842 A1 | 6/2006 | Miyamoto et al. |
| 2006/0126665 A1 | 6/2006 | Ward et al. |
| 2006/0146816 A1 | 7/2006 | Jain |
| 2006/0165009 A1 | 7/2006 | Nguyen et al. |
| 2006/0165052 A1 | 7/2006 | Dini et al. |
| 2006/0167894 A1 | 7/2006 | Wunner |
| 2006/0168240 A1 | 7/2006 | Olshefski |
| 2006/0203848 A1 | 9/2006 | Damphier et al. |
| 2006/0221967 A1 | 10/2006 | Narayan et al. |
| 2006/0233118 A1 | 10/2006 | Funk et al. |
| 2006/0235908 A1 | 10/2006 | Armangau et al. |
| 2007/0019640 A1 | 1/2007 | Thiede |
| 2007/0036156 A1 | 2/2007 | Liu et al. |
| 2007/0038665 A1 | 2/2007 | Kwak et al. |
| 2007/0050334 A1 | 3/2007 | Deninger et al. |
| 2007/0050465 A1 | 3/2007 | Canter et al. |
| 2007/0058631 A1 | 3/2007 | Mortier et al. |
| 2007/0124276 A1 | 5/2007 | Weissman et al. |
| 2007/0139231 A1 | 6/2007 | Wallia et al. |
| 2007/0140235 A1 | 6/2007 | Aysan et al. |
| 2007/0140295 A1 | 6/2007 | Akaboshi |
| 2007/0147263 A1 | 6/2007 | Liao et al. |
| 2007/0153796 A1 | 7/2007 | Kesavan et al. |
| 2007/0157306 A1 | 7/2007 | Elrod et al. |
| 2007/0162609 A1 | 7/2007 | Pope et al. |
| 2007/0162971 A1 | 7/2007 | Blom et al. |
| 2007/0223474 A1 | 9/2007 | Shankar |
| 2007/0248029 A1 | 10/2007 | Merkey et al. |
| 2007/0250817 A1 | 10/2007 | Boney |
| 2007/0271372 A1 | 11/2007 | Deninger et al. |
| 2007/0286175 A1 | 12/2007 | Xu et al. |
| 2007/0291755 A1 | 12/2007 | Cheng et al. |
| 2007/0291757 A1 | 12/2007 | Dobson et al. |
| 2007/0297349 A1 | 12/2007 | Arkin |
| 2008/0013541 A1 | 1/2008 | Calvignac et al. |
| 2008/0037539 A1 | 2/2008 | Paramaguru |
| 2008/0056144 A1 | 3/2008 | Hutchinson et al. |
| 2008/0117903 A1 | 5/2008 | Uysal |
| 2008/0159146 A1 | 7/2008 | Claudatos et al. |
| 2008/0175167 A1 | 7/2008 | Satyanarayanan et al. |
| 2008/0181245 A1 | 7/2008 | Basso et al. |
| 2008/0240128 A1 | 10/2008 | Elrod |
| 2008/0247313 A1 | 10/2008 | Nath et al. |
| 2008/0279216 A1 | 11/2008 | Sharif-Ahmadi et al. |
| 2008/0294647 A1 | 11/2008 | Ramaswamy |
| 2009/0003363 A1 | 1/2009 | Benco et al. |
| 2009/0006672 A1 | 1/2009 | Blumrich et al. |
| 2009/0028161 A1 | 1/2009 | Fullarton et al. |
| 2009/0028169 A1 | 1/2009 | Bear et al. |
| 2009/0041039 A1 | 2/2009 | Bear et al. |
| 2009/0073895 A1 | 3/2009 | Morgan et al. |
| 2009/0092057 A1 | 4/2009 | Doctor et al. |
| 2009/0097417 A1 | 4/2009 | Asati et al. |
| 2009/0097418 A1 | 4/2009 | Castillo et al. |
| 2009/0103531 A1 | 4/2009 | Katis et al. |
| 2009/0109875 A1 | 4/2009 | Kaneda et al. |
| 2009/0113217 A1 | 4/2009 | Dolgunov et al. |
| 2009/0116403 A1 | 5/2009 | Callanan et al. |
| 2009/0116470 A1 | 5/2009 | Berggren |
| 2009/0119501 A1 | 5/2009 | Petersen |
| 2009/0122801 A1 | 5/2009 | Chang |
| 2009/0168648 A1 | 7/2009 | Labovitz et al. |
| 2009/0182953 A1 | 7/2009 | Merkey et al. |
| 2009/0187558 A1 | 7/2009 | McDonald |
| 2009/0219829 A1 | 9/2009 | Merkey et al. |
| 2009/0245114 A1 | 10/2009 | Vijayaraghavan |
| 2009/0290580 A1 | 11/2009 | Wood et al. |
| 2009/0292681 A1 | 11/2009 | Wood et al. |
| 2010/0278052 A1 | 11/2010 | Matityahu et al. |

FOREIGN PATENT DOCUMENTS

| | | |
|---|---|---|
| EP | 1387527 A1 | 2/2004 |
| EP | 1494425 A1 | 1/2005 |
| EP | 1715627 A1 | 10/2006 |
| EP | 1971087 A1 | 9/2008 |
| GB | 2337903 A | 12/1999 |
| JP | 2002026935 A | 1/2002 |
| JP | 2002064507 A | 2/2002 |
| JP | 2002323959 A | 11/2002 |
| KR | 20060034581 A | 4/2006 |
| WO | WO 02/23805 A2 | 3/2002 |
| WO | WO 2005/109754 A1 | 11/2005 |
| WO | WO 2009/038384 A1 | 3/2009 |

OTHER PUBLICATIONS

Berners-Lee et al., "Hypertext Transfer Protocol—HTTP/1.0", IETF, RFC 1945, Network Working Group, 1996, 60 pgs.

Fielding et al., "Hypertext Transfer Protocol—HTTP/1.1", Internet Engineering task Force (IETF), Request for Comments (RFC) 2616, 2068, Netowrk Working Group, 1999, 165 pgs.

Hamill et al., "Petaminer: Efficient Navigation to Petascale Data Using Event-Level Metadata", Proceedings of XII Advanced Computing and Analysis Techniques in Physics Research, Nov. 2008, pp. 1-5.

Huang et al., PlanetFlow: Maintaining Accountability for Network Services, ACM SIGOPS Operating Systems Review 40, 1 (Jan 2006), 6 pgs.

Kim, Kwang Sik (Exr), International Search Report issued to application No. PCT/US09/41061, Nov. 26, 2009, 8 pgs.

Kim, Sae Young (Exr), International Search Report issued to application No. PCT/US09/41060, Dec. 3, 2009, 8 pgs.

Kwon, Oh Seong (Exr), International Search Report issued to application No. PCT/US09/40733, Nov. 24, 2009, 3 pgs.

Lupia, Sergio (Exr), International Search Report issued to application No. PCT/US10/56739, Apr. 1, 2011, 15 pgs.

Lupia, Sergio (Exr), International Search Report issued to application No. PCT/US10/56723, Apr. 20, 2011, 14 pgs.

Stockinger, "Network Traffic Analysis with Query Driven Visualization—SC2005 HPC Analytics Results", Proceedings of the 2005 ACM/IEEE SC/05 Conference, Nov. 2005, 4 pgs.

\* cited by examiner

HARDWARE ACCELERATED APPLICATION-BASED PATTERN MATCHING FOR REAL TIME CLASSIFICATION AND RECORDING OF NETWORK TRAFFIC

CROSS REFERENCE TO RELATED APPLICATIONS

This application claims priority to U.S. Provisional Patent Application No. 61/453,456, filed Mar. 16, 2011, entitled, "Hardware Accelerated Application-Based Pattern Matching for Real Time Classification and Recording of Network Traffic", the contents of which are incorporated herein by reference.

BACKGROUND

This disclosure relates generally to network forensics, and in particular to utilizing a parallel pattern matching processing unit to perform pre-classification of packets in a packet stream for real time classification and recording of network traffic.

The field of network forensics involves, among other things, various different possible methods of discovering and analyzing the contents of packetized data transmitted over a network. Identifying particular forms of data (e.g., a motion pictures experts group (MPEG) file, a voice over Internet protocol (VoIP) session, etc.), as well as the content of a particular form of data (.e.g., the actual audio file encoded pursuant to the MPEG standard, the audio related to the VoIP session, etc.) transmitted over a network can be a time consuming and computationally intensive task. Such identification may be particularly time consuming and computationally intensive given the rate and volume of packets that may be transmitted over a network.

If packets are recorded for subsequent examination or searching (as is practiced in network metric, security and forensic applications), then identifying a particular form of data and extracting the contents of the data may involve first searching an entire database of packets, possibly 10 s, 100 s, or more terabytes of data, to identify any data possibly conforming to the search request. Such a search may not be conducive to practical, real time discovery and analysis of data types and contents of interest.

Packets may be analyzed and indexed in a database as they are being recorded. By forming indices based on packet characteristics, metadata, and locations where the packets are recorded, identifying and reporting on a particular instance of data and extracting the contents of the data may be performed by searching the indices instead of the entire database of packets. This approach may reduce time and computation required to search. However, this approach may also increase the time and computation required to record the packets.

Recording packets of a network with a high rate and volume of such packets can be a time consuming and computationally intensive task. Time and computational resources needed for real time analyzing and indexing while recording packets may not be feasible. Even if such real time analyzing and indexing is feasible, the amount of analysis that is possible may be limited.

SUMMARY

A system includes a shared memory with slots to transiently store network data packets. A packet capture repository utilizes a non-transitory storage medium. An indexing database utilizes a non-transitory storage medium. A pattern matching processing unit generates preclassification data for the network data packets utilizing pattern matching analysis. At least one processing unit implements a storage process that receives the network data packets, stores the network data packets in at least one of the slots, and transfers the network data packets to the packet capture repository when the slots in the shared memory are full. A preclassification process requests from the pattern matching processing unit the preclassification data. An indexing process determines, based upon the preclassification data, whether to invoke or omit additional analysis of the network data packets, and performs at least one of aggregation, classification, or annotation of the network data packets in the shared memory to maintain one or more indices in the indexing database.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the disclosure that follows.

DETAILED DESCRIPTION

In the following description, for the purposes of explanation, numerous specific details are set forth in order to provide a thorough understanding of the various embodiments. It may be evident, however, to one skilled in the art that the various embodiments may be practiced without these specific details.

Figure 1:
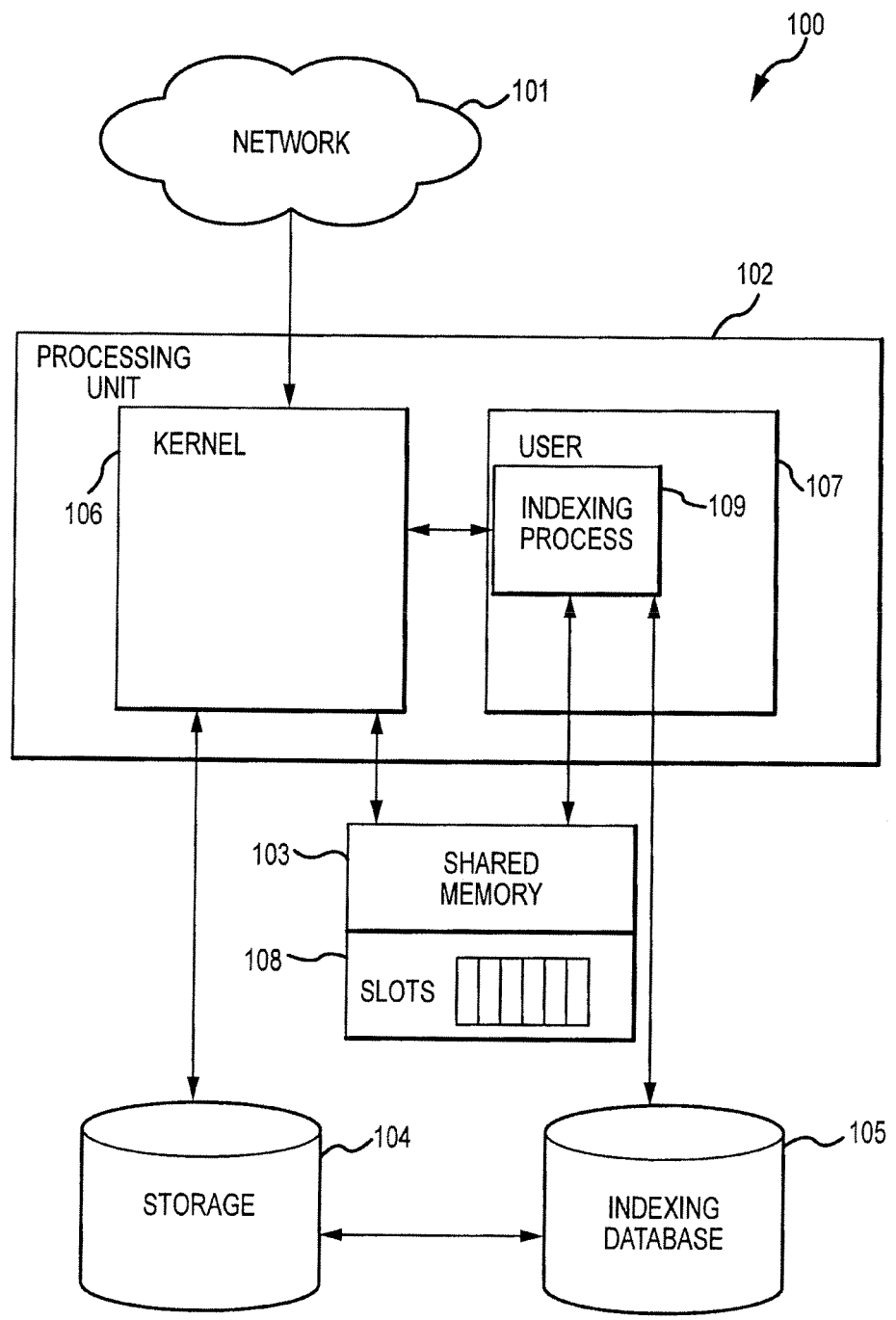
FIG. 1 is a diagram illustrating real time classification and recording of packetized network traffic.

FIG. 1 is a diagram illustrating the functional flow 100 of real time capturing, aggregating, classifying, annotating, and storing packetized data transmitted over a network 101. As illustrated, one or more kernel-level processes 106 executing on one or more processing units 102 may receive a stream of packets transmitted on the network 101. A kernel is the main component of most computer operating systems. It is a bridge between applications and the actual data processing done at the hardware level. The kernel's responsibilities include managing the system's resources (the communication between hardware and software components). Usually as a basic component of an operating system, a kernel can provide the lowest-level abstraction layer for the resources (e.g., processors and I/O devices) that application software must control to perform its function. It typically makes these facilities available to application processes through inter-process communication mechanisms and system calls.

As the stream of packets is received, the kernel-level process may utilize copyless direct memory access (DMA) techniques to store the packets of the stream in slots 108 of a memory 103. DMA allows certain hardware subsystems within the computer to access system memory independently of the central processing unit (CPU). Without DMA, when the CPU is using programmed input/output, it is typically fully occupied for the entire duration of the read or write operation, and is thus unavailable to perform other work. With DMA, the CPU initiates the transfer, does other operations while the transfer is in progress, and receives an interrupt from the DMA controller when the operation is done. This feature is useful any time the CPU cannot keep up with the rate of data transfer, or where the CPU needs to perform useful work while waiting for a relatively slow I/O data transfer. Computers that have DMA channels can transfer data to and from devices with much less CPU overhead than computers without a DMA channel. Similarly, a processing element inside a multi-core processor can transfer data to and from its local memory without occupying its processor time, allowing computation and data transfer to proceed in parallel. DMA can also be used for "memory to memory" copying or moving of data within memory. DMA can offload expensive memory operations from the CPU to a dedicated DMA engine.

The memory 103 is shared with one or more user-level processes 107 executed by the processing unit 102. When the slots in the memory are full, the kernel-level process may transfer the packets in the slots in memory to slots in a packet repository in the storage 104, also utilizing copyless DMA techniques.

While the kernel-level process is storing the packets of the stream in slots of the memory, an indexing process 109 of the user-level processes may access the packets in the slots of the memory and aggregate, classify, and annotate the packets based on various characteristics to maintain indices in an indexing database 105. The indices may reference locations in the slots in the packet repository where packets are stored.

However, the indexing process 109 executed by the processing unit 102 may be limited by the amount of analysis that the indexing process has resources to perform on the packets for purposes of aggregating, classifying, and annotating in real time. Regardless of the processing resources available to the indexing process, and though the rate and volume of the stream of packets may vary, the processing unit may continue to receive additional packets of the stream. As such, the indexing process may have to limit the amount of analysis performed on packets that have been received in order to perform analysis on the next received packets in the stream.

Figure 2:
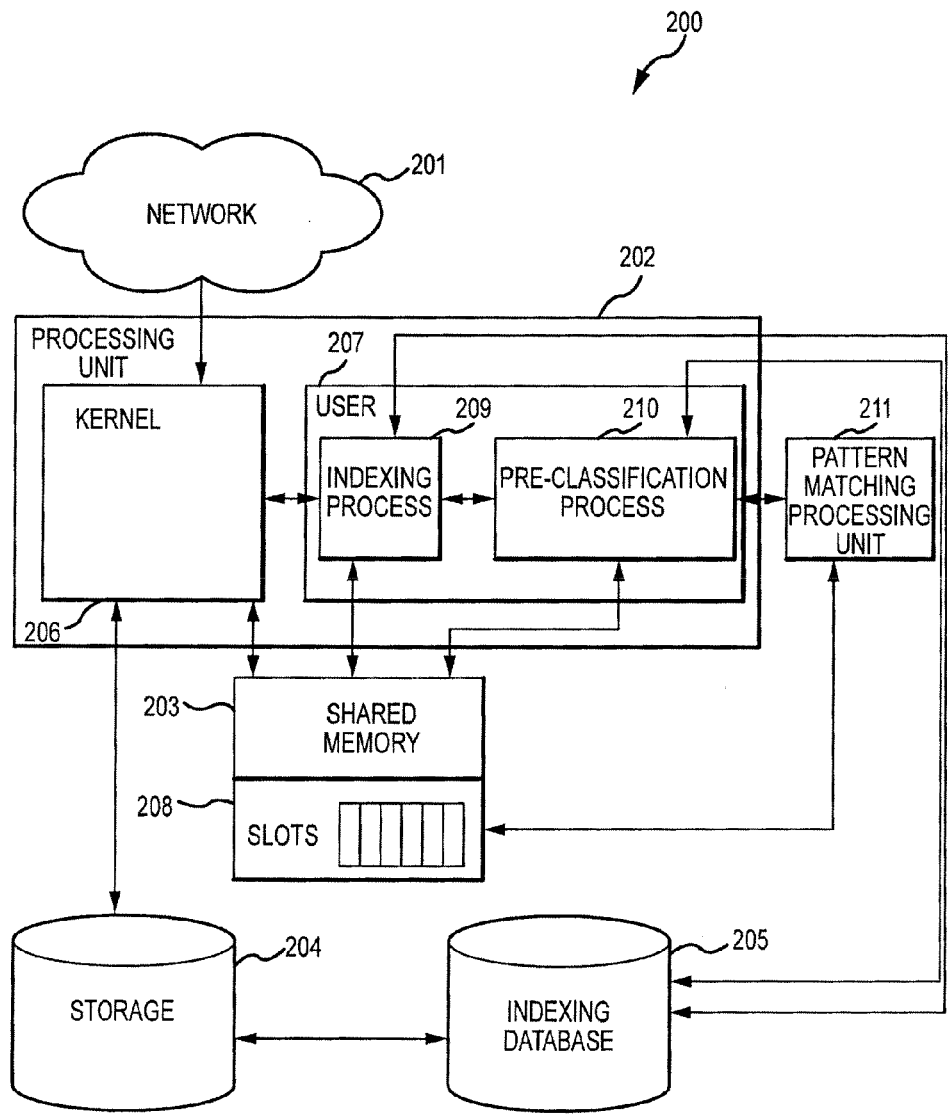
FIG. 2 is a diagram illustrating hardware accelerated application-based pattern matching for real time classification and recording of packetized network traffic in accordance with an embodiment of the invention.

By way of contrast to the functional flow 100 of real time capturing, aggregating, classifying, annotating, and storing packetized data transmitted over a network 101 illustrated in FIG. 1, FIG. 2 is a diagram illustrating the functional flow 200 of hardware accelerated application-based pattern matching for real time classification and recording of packetized data transmitted over a network 201. As illustrated, one or more kernel-level processes 206 executing on one or more processing units 202 may receive a stream of packets transmitted on the network 201. As the stream of packets is received, the kernel-level process may utilize copyless direct memory access (DMA) techniques to store the packets of the stream in slots 208 of a memory 203 that is shared with one or more user-level processes 207 executed by the processing unit 202. When the slots in the memory are full, the kernel-level process may transfer the packets in the slots in memory to slots in a packet repository in the storage 204, also utilizing copyless DMA techniques.

While the kernel-level process 206 is storing the packets of the stream in slots 208 of the memory 203, an indexing process 209 of the user-level processes may interact with a preclassification process 210 of the user-level processes to access the packets in the slots of the memory and aggregate, classify, and annotate the packets based on various characteristics to maintain indices in an indexing database 205. The indices may reference locations in the slots in the packet repository where packets are stored.

The preclassification process 210 may include requisite levels of preprocessing on the data for normalization (e.g., perform decompression and encoding transformations to arrive at a consistent representation of the data for pattern matching). The preclassification process 210 may communicate with a pattern matching processing unit 211 to request the pattern matching processing unit perform preclassification on the packets in the slots 208 of the memory 203 by performing pattern matching analysis. In one embodiment, Aho-Corasick string matching is used. Aho-Coasick string matching is a kind of dictionary-matching algorithm that locates elements of a finite set of strings (the "dictionary") within an input text. It matches all patterns simultaneously. The complexity of the algorithm is linear in the length of the patterns plus the length of the searched text plus the number of output matches.

In performing the pattern matching analysis, the pattern matching processing unit may determine one or more characteristics of the packets in the slots of the memory, such as identifying the application to which the packets relate, the protocol utilized to transmit the packets, file types of payload data content, source and/or destination addresses associated with the packets, packet lengths, and so on. The pattern matching processing unit may determine the characteristics by comparing bit patterns of the packets with a library of bit patterns associated with the characteristics.

The pattern matching processing unit 211 may be one or more types of processing units capable of performing pattern matching analysis on multiple packets in parallel. For example, the pattern matching processing unit may be a graphical processing unit that includes thousands of separate cores which may each perform pattern matching analysis on a different packet. As such, the pattern matching processing unit may simultaneously (or substantially simultaneously) perform pattern matching analysis on the packets of one or more slots 208 in the memory 203.

The pattern matching processing unit 211 may return the results of the pattern matching analysis to the preclassification process 210. The preclassification process may then interact with the indexing process 209 to aggregate, classify, and annotate the packets based on the results of the pattern matching analysis, as well as any additional analysis of the packets performed by the indexing process to maintain the indices in the indexing database 205. As result of offloading pattern matching analysis to a pattern matching processing unit which can analyze multiple packets in parallel, the amount of real time analysis that can be performed on received packets may be greater than in the functional flow 100 illustrated in FIG. 1. This may further reduce time and computation required to search for stored packets over that possible with the functional flow 100 illustrated in FIG. 1.

Figure 3:
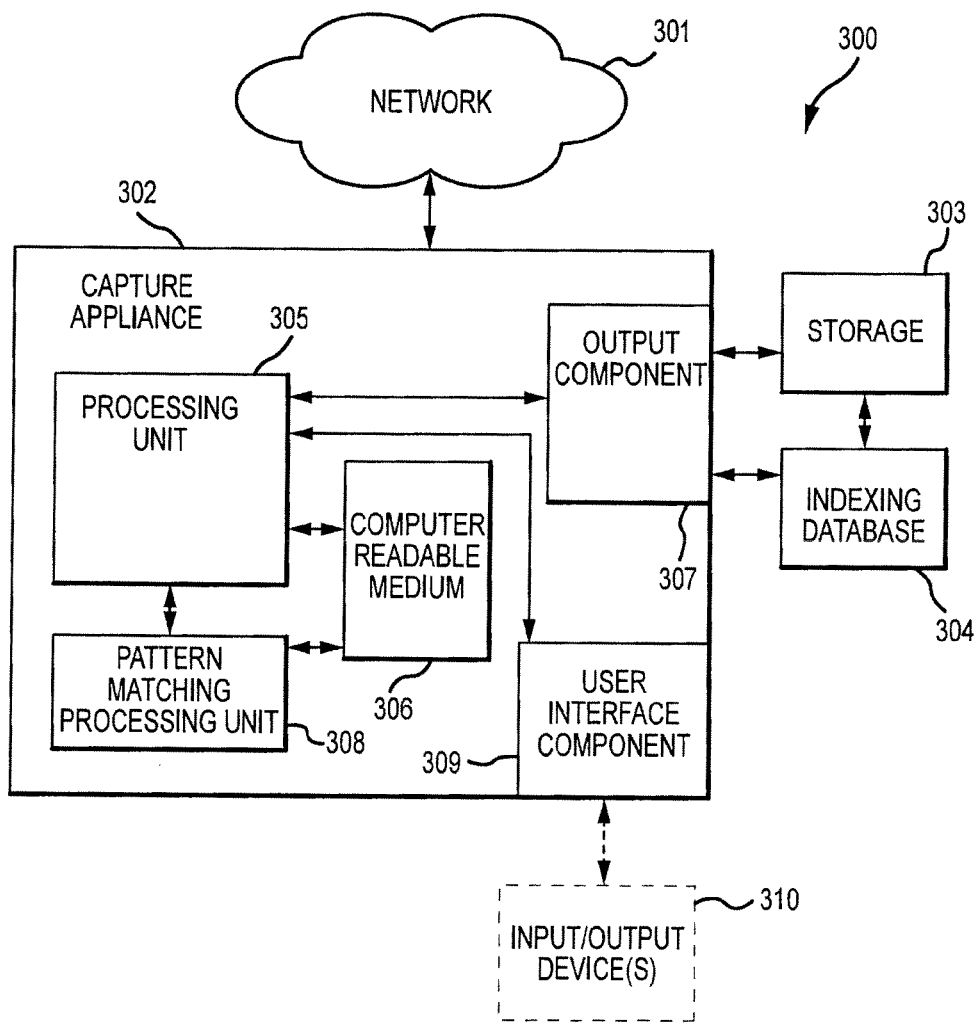
FIG. 3 is a system for hardware accelerated application-based pattern matching for real time classification and recording of network traffic in accordance with an embodiment of the invention.

FIG. 3 illustrates a system 300 for hardware accelerated application-based pattern matching for real time classification and recording of network traffic. The system may utilize various techniques and/or apparatuses described in published PCT application PCT/US2005/045566 entitled "Method and Apparatus for Network Packet Capture Distributed Storage System", published U.S. application Ser. No. 12/126,656 entitled "Method and Apparatus to Index Network Traffic Meta-Data" (US 2009/0290492), published U.S. application Ser. No. 12/126,551 entitled "Method and Apparatus of Network Artifact Identification and Extraction" (US 2009/0290580), published U.S. application Ser. No. 12/471,433 entitled "Presentation of An Extracted Artifact Based on an Indexing Technique" (US 2009/0292681), and published U.S. application Ser. No. 12/126,619 titled "On Demand Network Activity Reporting Through a Dynamic File System and Method" (US 2009/0292736), all of which are herein incorporated by reference in their entirety.

The system 300 includes a capture appliance 302 that is communicably coupled to a network 301, storage 303, and an indexing database 304. Data packetized according to a variety of different protocols (such as hypertext transfer protocol, file transfer protocol, Internet Protocol version 4, Internet Protocol version 6, transmission control protocol, user datagram protocol, server message block, simple mail transfer protocol, and so on) may be transmitted over the network. The capture appliance may be operable to capture, aggregate, annotate, store, and index network packet data in real time from one or more portions of the network and retrieve such data utilizing the storage and the indexing database. Thus, the storage may be operable as a packet capture repository and the indexing database may be operable as an index into the packet capture repository. The storage may include any kind of storage media (such as one or more magnetic storage media, optical storage media, volatile memory, non-volatile memory, flash memory, and so on) configured as a Redundant Array of Independent Discs (RAID) implementation, a storage area network, and so on.

The capture appliance 302 may include at least one processing unit 305, one or more computer readable media 306 (such as random access memories, hard disks, flash memory, cache memory, non-volatile memory, optical storage media, and so on), one or more pattern matching processing units 308, and one or more output components 307 that are operable to communicate with the storage 303 and/or the indexing database 304. The capture appliance may also include one or more user interface components 309 which may be operable to interact with one or more input/output devices 310. The capture appliance may be a dedicated device in some implementations. In other implementations, the capture appliance may be software operating in a virtualized environment implemented by the processing unit executing one or more instructions stored in the computer readable media.

The processing unit 305 may execute instructions stored in the computer readable medium 306 to implement one or more packet storage processes that receive one or more streams of packets transmitted on the network 301 and store the packets in slots of a shared memory (which may be the computer readable medium) utilizing DMA techniques, such as copyless DMA techniques. The slots may be of a fixed size, such as 64 megabytes. When the slots in the shared memory are full, the packet storage process may transfer the packets in the slots in shared memory to slots in the packet repository in the storage 303, also utilizing DMA techniques, such as copyless DMA techniques.

The processing unit 305 may also execute instructions stored in the computer readable medium 306 to implement one or more indexing processes and one or more preclassification processes. As the packet storage process stores the packets in slots of the shared memory, the indexing process may interact with the preclassification process to access the packets in the slots of the shared memory and aggregate, classify, and/or annotate the packets based on various characteristics in order to maintain indices in the indexing database 304. The indices may reference locations in the slots in the packet repository where packets are stored. The preclassification process may communicate with the pattern matching processing unit 308 to request the pattern matching processing unit perform preclassification on the packets in the slots of the shared memory. The pattern matching processing unit may return the results of the preclassification to the preclassification process and the preclassification process may then interact with the indexing process to aggregate, classify, and/or annotate the packets based on the results. Additionally, the indexing process may perform additional analysis of the packets to maintain the indices in the indexing database.

The pattern matching processing unit 308 may be one or more processing units capable of performing preclassification on multiple packets in parallel. For example, the pattern matching processing unit may be a graphical processing unit or other kind of parallel processing unit that includes multiple separate cores (such as hundreds, thousands, and so on) which may each perform preclassification on a different packet. Thus, the pattern matching processing unit may simultaneously or nearly simultaneously perform preclassification on the packets of one or more slots in the shared memory.

The pattern matching processing unit 308 may perform preclassification on the packets by utilizing pattern matching analysis (such as Aho-Corasick string matching and so on) to compare bit patterns of the packets with a library of bit patterns that are associated with various characteristics of packets. Such packet characteristics may include the application to which the packets relate, the protocol utilized to transmit the packets, file types of payload data content, source and/or destination addresses associated with the packets, packet lengths, and so on. For example, the pattern matching processing unit may utilize pattern matching analysis to determine the software application to which the packets relate, such as a world wide web (WWVV) application, an instant message application, Facebook™, a computer virus, a Flash™ video application, a peer-to-peer file sharing application, and so on. In such an example, entries in the library of bit patterns may be created by analyzing packets that are known to relate to particular software applications and identifying bit patterns common to the particular software applications. Based on the software application identified for one or more packets by the pattern matching analysis, the indexing process may perform additional analysis of the packets, skip additional analysis of the packets, and so on.

In this example, when packets are identified as relating to a peer-to-peer file sharing application (such as Kazaa™), the indexing process may perform additional analysis to determine the names and types of files being shared. Further in this example, when packets are identified as relating to a Flash™ video application, the indexing process may skip additional analysis. The indexing process may be so configured under the assumption that packets relating to peer-to-peer file sharing applications merit additional analysis because such applications may be utilized to exchange content in violation of copyright whereas Flash™ video applications are less likely to be utilized for such purposes. In this way, the indexing process may utilize the preclassification to guide how available resources of the indexing process are spent. Hence, the indexing process may be able to dedicate resources to further analyzing packets relating to software applications that are more concerning (such as viruses) without wasting resources on further analyzing packets relating to software applications that are less concerning (such as word processing applications).

Other embodiments of the invention identify and index on protocol-specific attributes. For example, after identifying a particular flow as an HTTP protocol flow, there may be further identifying and indexing on such attributes as User-Agent, HTTP Referer, Cookie, Host, x-forwarded-for, etc. Further, identifying and indexing may be based on elements of common web-based applications, such as identifying a particular HTTP session as being an instance of a LinkedIn session, and then identifying and indexing on the username within that LinkedIn (or similar social networking site) web session. Similar processing may be performed with You-Tube®, including providing a description of a video being posted.

Although the present example discusses utilizing preclassification to determine the software application to which the packets relate, it should be understood that preclassification may determine other characteristics of packets that may be utilized to identify packets to perform additional analysis upon, skip performing additional analysis upon, and so on. For example, preclassification may determine one or more of protocols utilized to transmit the packets, file types of payload data content, source and/or destination addresses associated with the packets, packet lengths, and so on.

By way of another example, the pattern matching processing unit 308 may utilize pattern matching analysis to determine whether or not the packets related to an already identified traffic flow (i.e., the entire network conversation to which a packet relates). Based on the recognition that one or more packets relate to an already identified traffic flow, the indexing may skip additional analysis of the packets (as the flow has already been analyzed) and the packets may be indexed based on the analysis of the flow that has already been performed. Hence, the indexing process is able to leverage the preclassification to dedicate resources to further analyzing packets relating to flows that have not yet been analyzed without wasting resources on further analyzing packets that relate to already analyzed flows.

In one or more implementations, the processing unit 305 of the capture appliance 302 may also be operable to execute instructions stored in the computer readable medium 306 to query the indexing database 105 in response to input received from the input/output device(s) 310 via the user interface component 309. As part of such a query, the processing unit may be operable to retrieve one or more packets stored in one or more slots of the packet capture repository referenced by one or more indices of the indexing database. The processing unit may then provide and/or display the retrieved packets and/or other information regarding the query, the retrieved packets, and so on to the input/output device(s) via the user interface component.

In FIG. 3, the network 301 is illustrated as a single network. However, in various implementations the network may be composed of multiple local area networks, metropolitan area networks, wide area networks (such as the Internet), virtual private networks, and so on of various kinds (wired, wireless, Ethernet, gigabit Ethernet, twisted pair, fiber optic, coaxial, cellular, and so on) which are connected via various kinds of switches, hubs, gateways, and so forth.

Figure 4:
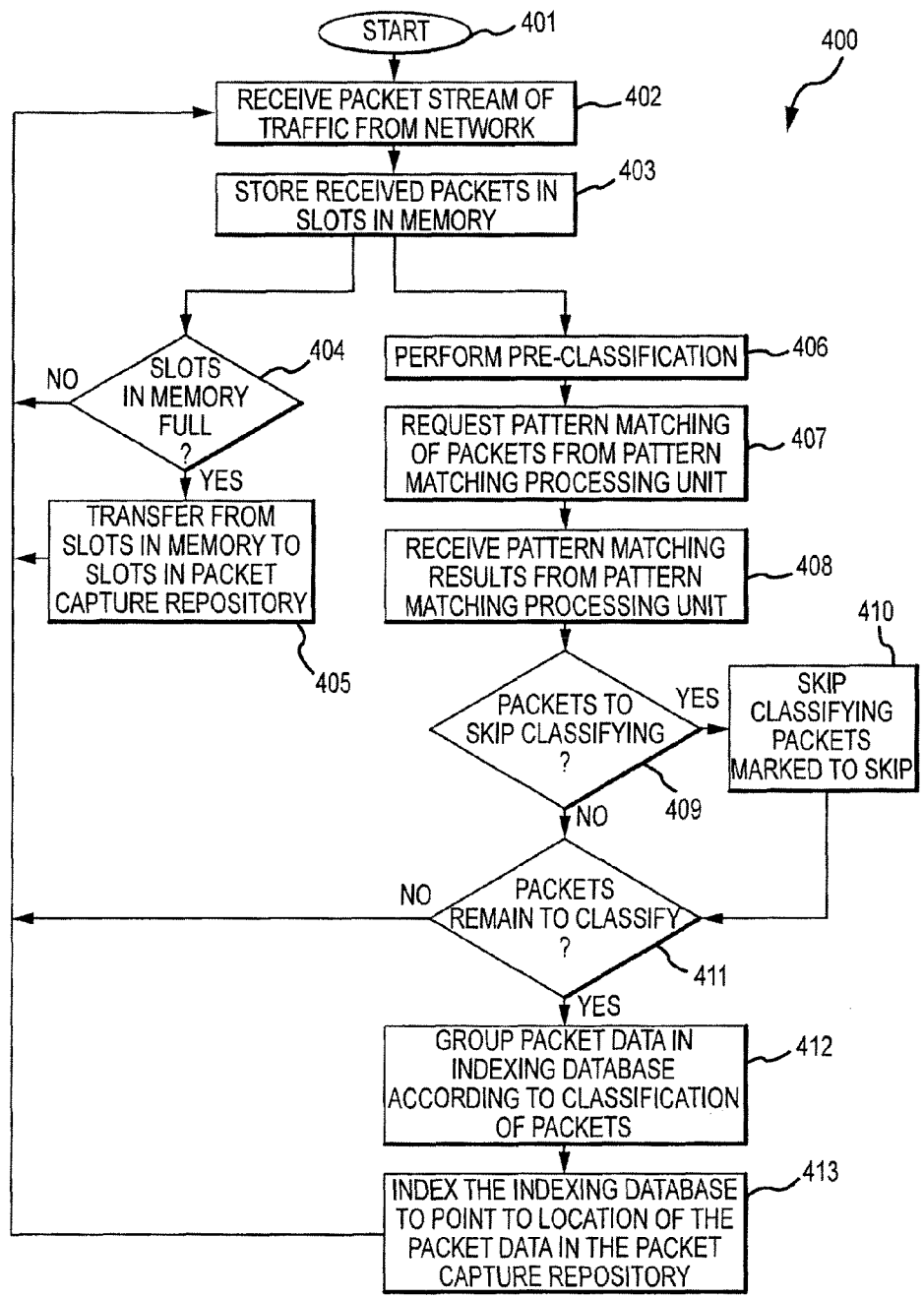
FIG. 4 is a flow chart illustrating a disclosed method for hardware accelerated application-based pattern matching for real time classification and recording of network traffic.

FIG. 4 illustrates a method 400 for hardware accelerated application-based pattern matching for real time classification and recording of network traffic. The method may be performed by the processing unit 305 of FIG. 3. The method begins at block 401 and then the flow proceeds to block 402. At block 402, the processing unit receives a packet stream of network traffic from the network 301. The flow then proceeds to block 403, where a packet storage process executed by the processing unit stores the received packets of the stream in slots in a shared memory. The flow then splits and proceeds (either simultaneously or independently) to both block 404 and block 406.

At block 404, after the packet storage process stores the received packets in slots of the shared memory, the packet storage process determines whether the slots of the shared memory are full. If so, the flow proceeds to block 405. If not, the flow returns to block 402 where the processing unit 305 continues to receive the packet stream of network traffic from the network 301. At block 405, after the packet storage process determines the slots of the shared memory are full, the packet storage process transfers packets stored in the slots of the shared memory to slots of the packet capture repository in the storage 303. Transfer of packets stored in the slots of the shared memory may be performed in a first in first out order when the slots of the shared memory are full.

At block 406, after the packet storage process stores the received packets in slots of the shared memory, a preclassification process executed by the processing unit 305 beings performing preclassification of the packets stored in the slots of the shared memory. The flow proceeds to block 407 where the preclassification process requests the pattern matching processing unit perform pattern matching of the packets stored in the slots of the shared memory. The flow next proceeds to block 408 where the preclassification process receives the pattern matching results from the pattern matching processing unit before the flow proceeds to block 408.

At block 409, an indexing process executed by the processing unit 305 determines whether or not the pattern matching results specify to skip classification of one or more of the packets stored in the slots of the shared memory. If so, the flow proceeds to block 410 where the indexing process skips classification of the one or more packets specified to skip before the flow proceeds to block 411. Otherwise, the flow proceeds to block 411.

At block 411, the indexing process determines whether any of the packets stored in the slots of the shared memory remain to be classified. If so, the flow proceeds to block 412 for classification. Otherwise, the flow returns to block 402 where the processing unit 305 continues to receive the packet stream of network traffic from the network 301.

At block 412, after the indexing process determines that packets stored in the slots of the shared memory remain to be classified, the indexing process groups packet data in the indexing database 304 according to classification of the packets. The classification may include deep packet inspection, header evaluation, and so on. The flow then proceeds to block 413 where the indexing process indexes the indexing database to point to locations of packet data in the packet capture repository in the storage 303. The flow then returns to block 402 where the processing unit 305 continues to receive the packet stream of network traffic from the network 301.

Figure 5:
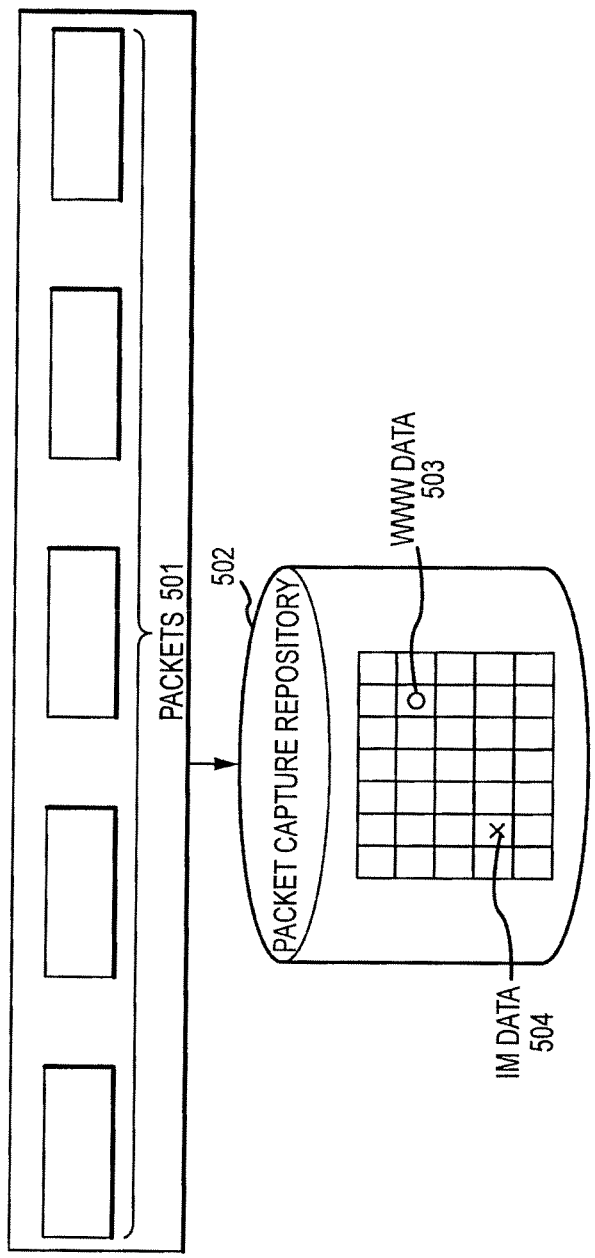
FIG. 5 is a diagram illustrating storage of packet data in a packet capture repository.

FIG. 5 illustrates storing of packet data in a packet capture repository 502. The illustrated storing of packet data may be performed by the capture appliance 302 of FIG. 3. Referring again to FIG. 5, packetized data may be identified in a flow of packets 501 crossing a network and the identified packet data may be stored in the packet capture repository. In some implementations, all packets flowing through a particular point in a network, such as at the location of a network tap, may be stored in the packet capture repository. Practically speaking, some packets may be lost or dropped due to various issues including delivery failure or practical limits of computing technology, but the system attempts to capture every packet.

The packets 501 may include a data unit (e.g., packets of data of an email, an instant message communication, an audio file, a compressed file, etc.) that may be carried by a flow of the packets in the network. The packet capture repository may contain a collection of packets whose contents might fall into a variety of classes such as software applications to which the packet data relates. By way of example, FIG. 5 illustrates that the packet capture repository contains collections of packets whose contents are related to a World Wide Web (WWW) application 503 (such as a web browser) and an Instant Messaging (IM) application 504 (such as the Facebook™ instant messenger client).

Figure 6:
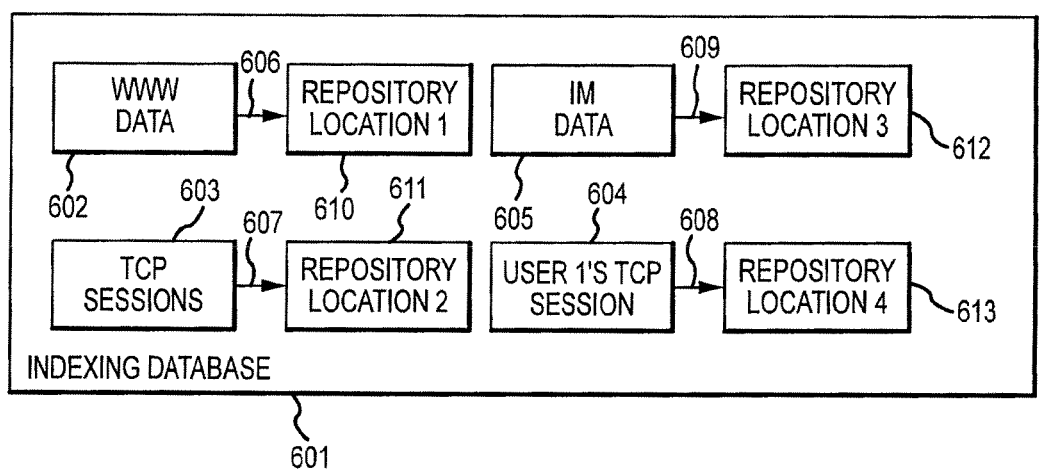
FIG. 6 is a diagram illustrating an indexing database that includes indices to packets contained within a packet capture repository.

FIG. 6 is a diagram illustrating an indexing database 601 that includes indices to packets contained within a packet capture repository. The illustrated indexing database 601 may be the indexing database 304 of FIG. 3. Referring again to FIG. 6, the indexing database 601 may be a collection of meta-data that is stored in an organized manner so that the data packets may be accessed efficiently through a query.

The information (e.g., packet data, meta-data, etc.) may be extracted from the indexing database 601 through a suitable database query. The database query may be performed through any number of interfaces including a graphical user interface, a web services request, a programmatic request, a structured query language (SQL), and so on, which is used to extract related information of a packet data or any meta-data stored in the indexing database. If queried packet data/information is matched with the data stored in the indexing database, then packets matching the query may be retrieved from an associated packet repository for reconstruction.

The matched packet data may be reconstructed by referring to a memory location corresponding to designated packet data. The indexing database may point to members of a collection of data packets according to "class," where class may include any data such as software applications to which the packets relate, attributes of a packet header, the presence of a multi media file flowing across the network, a session of a particular user of the network at a particular point in time, and so on. The pointers may point to the memory location of packets stored in the packet capture repository for the purpose of efficient retrieval of relevant packets. The indexing database may point to packets according to their having been classified as containing applications, files, and other data shared through the network in the native packetized format in which it was transmitted. Also, the sessions of each individual user in the network may be stored in the indexing database. Sessions may be grouped and stored in the database.

For example, the indexing database 601 may include indexed WWW data 602, indexed TCP session data 603, indexed data for a particular user's TCP session 604, indexed IM data 605, and so on. Each index 602, 603, 604, and 605 may be a unit of the indexing database. In addition, the indexing database may include pointers pointing to a packet capture repository location of particular information corresponding to an index.

For example, a first pointer 606 may point to a first packet capture repository location 610 within the packet capture repository to represent the contents stored in a particular location of the indexed WWW data 602. A second pointer 607 may point to a second packet capture repository location 611 within the packet capture repository to represent the contents stored in a particular location of the indexed TCP session data 603. A third pointer 609 may point to a third packet capture repository location 612 within the packet capture repository to represent the contents stored in a particular location of the indexed IM data 605. A fourth pointer 608 may point to a fourth packet capture repository location 613 within the packet capture repository to represent the contents stored in a particular location of the indexed data for particular user's TCP session 604, and so on.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a: magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system, comprising:
   a shared memory that includes a plurality of slots to transiently store network data packets;
   a packet capture repository utilizing a non-transitory storage medium;
   an indexing database utilizing a non-transitory storage medium;
   a pattern matching processing unit to generate preclassification data for the network data packets utilizing pattern matching analysis, wherein the pattern matching processing unit includes a graphical processing unit with multiple cores to analyze multiple network data packets in parallel; and
   at least one processing unit that implements:
      a storage process that receives the network data packets, stores the network data packets in at least one of the slots, and transfers the network data packets to the packet capture repository when the slots in the shared memory are full;

a preclassification process that request from the pattern matching processing unit the preclassification data; and an indexing process to:
- determine, based upon the preclassification data, whether to invoke or omit additional analysis of the network data packets, such that the indexing process resources are dedicated to further analyzing network data packets of greater concern, and
- perform at least one of aggregation, classification, or annotation of the network data packets in the shared memory to maintain one or more indices in the indexing database.

2. The system of claim 1 wherein the preclassification process normalizes data within the network data packets.

3. The system of claim 1 wherein the pattern matching analysis is Aho-Corasick string matching.

4. The system of claim 1 wherein the pattern matching analysis is selected from identifying the application to which the network data packets relate, identifying the protocol utilized to transmit the network data packets, identifying file types of payload data in the network data packets, identifying source or destination addresses associated with the network data packets and identifying the lengths of network data packets.

5. The system of claim 1 wherein copyless direct memory access data transfers are used between the plurality of slots.

6. The system of claim 1 wherein the additional analysis determines the names and types of files being shared.

7. The system of claim 1 wherein the additional analysis includes identifying and indexing protocol-specific attributes.

8. The system of claim 1 wherein the additional analysis includes identifying and indexing web-based applications.

9. The system of claim 8 wherein identifying and indexing web-based applications includes identifying and indexing a particular HTTP session.

* * * * *